(12) United States Patent
McCaine

(10) Patent No.: X9567
(45) Date of Patent: Mar. 31, 1836

(54) RAIL-ROAD, PLATES, JOINTING

(76) Inventor: A. Mesick McCaine

United States Patent
Patent No.: X9567
A. M. McCaine.
Railroad Rail Joint.
Patented Mar. 31, 1836.
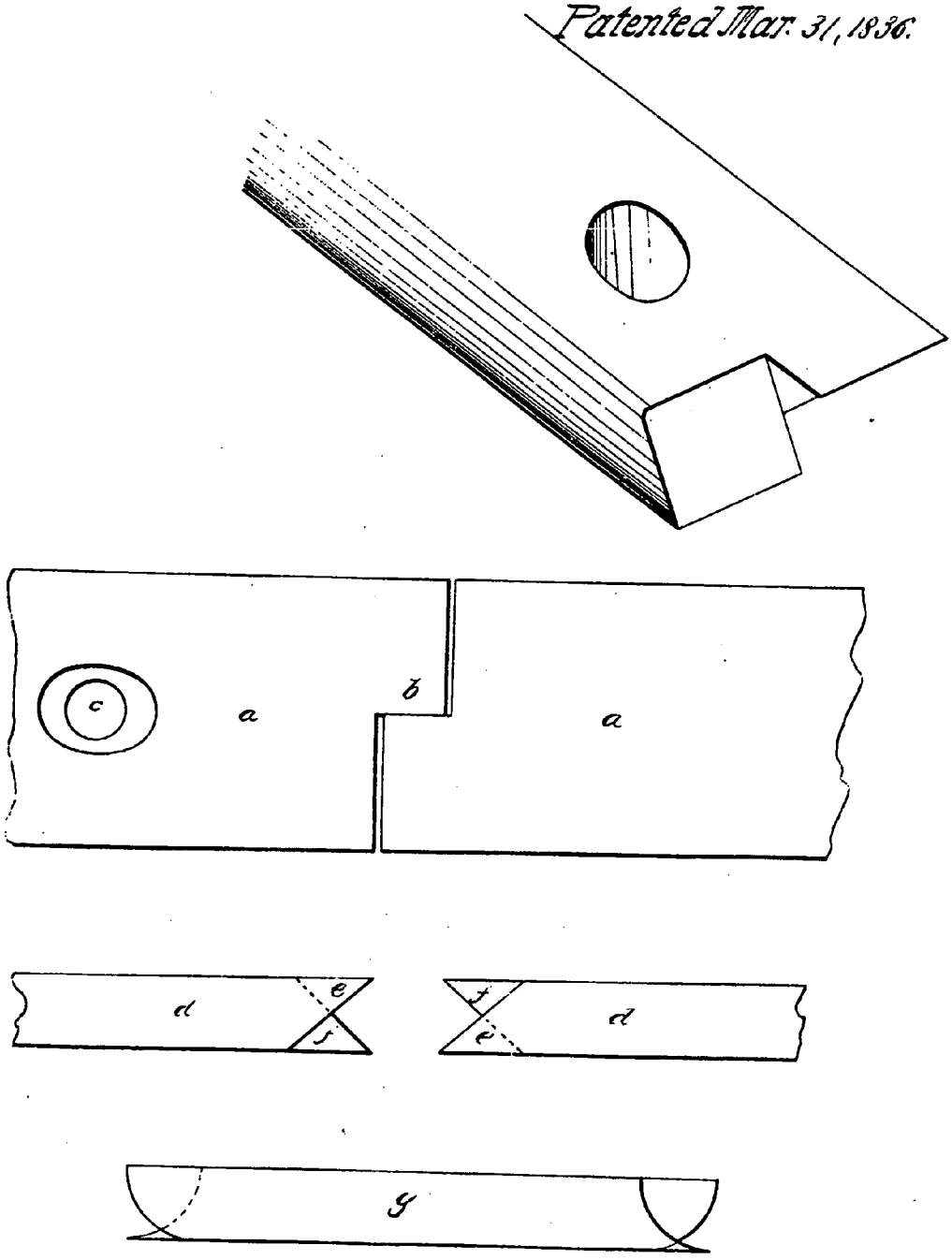
THE GRAPHIC CO. PHOTO-LITH. 39 & 41 PARK PLACE, N.Y.